(12) United States Patent
Haruta et al.

(10) Patent No.: US 6,444,317 B1
(45) Date of Patent: Sep. 3, 2002

(54) DECORATIVE FILM FOR USE IN PLASTICS MOLDING, PROCESS FOR PREPARING THE SAME AND INJECTION-MOLDED PART BY USE OF THE SAME

(75) Inventors: Naoya Haruta; Tadahiro Kato; Takesi Tomiyama; Koichi Seike, all of Kanagawa-ken (JP)

(73) Assignee: Kansai Paint Co., Ltd. (JP)

( * ) Notice: Subject to any disclaimer, the term of this patent is extended or adjusted under 35 U.S.C. 154(b) by 0 days.

(21) Appl. No.: 09/369,201

(22) Filed: Aug. 6, 1999

(30) Foreign Application Priority Data

Aug. 6, 1998 (JP) .......................... 10-222823
Sep. 29, 1998 (JP) .......................... 10-275538
Sep. 30, 1998 (JP) .......................... 10-276818

(51) Int. Cl.$^7$ .......................... B32B 27/40; B29C 39/12
(52) U.S. Cl. ................ 428/409; 428/423.1; 428/424.8; 428/515; 428/516; 264/246; 264/247
(58) Field of Search .......................... 428/31, 515, 516, 428/520, 208, 323, 328, 424.8, 423.1, 409; 264/246, 247

(56) References Cited

U.S. PATENT DOCUMENTS 5,288,520 A * 2/1994 Toyoshima et al. ......... 427/322
5,425,969 A * 6/1995 Wakabayashi et al. ...... 427/470

FOREIGN PATENT DOCUMENTS

| JP | 58-203048 | 11/1983 |
| JP | 63-123469 | 5/1988 |
| JP | 63-216717 | 9/1988 |
| JP | 8-2250 | 1/1996 |
| JP | 8-52416 | 2/1996 |

* cited by examiner

Primary Examiner—Paul Thibodeau
Assistant Examiner—Monique R. Jackson
(74) Attorney, Agent, or Firm—Fisher, Christen & Sabol

(57) ABSTRACT

A decorative film for use in plastics molding, the decorative film being a laminate film prepared by outwardly and successively laminating a polyolefin film layer, a primer layer, optionally a topcoating layer and a releasable layer, the primer layer being a coating film formed from an isocyanate-curing type resin composition containing (A) a hydroxyl group-containing resin having a hydroxyl number of 30 to 200 KOH mg/g on an average and a weight average molecular weight of 1000 to 80000, (B) a polyolefin based resin and (C) a (blocked) polyisocyanate compound in such mixing amounts that a number of the isocyanate group in the component (C) is in the range of 0.1 to 0.9 per one hydroxyl group in the component (A) and that the component (B) is in the range of 1 to 90% by weight based on a total weight of the components (A), (B) and (C), and having a static glass transition temperature of 20 to 70° C., an elongation of 10% or more and a tensile strength of 0.5 kgf/mm$^2$ or more; a process for preparing the decorative film and an injection-molded part by use of the decorative film.

7 Claims, No Drawings

DECORATIVE FILM FOR USE IN PLASTICS MOLDING, PROCESS FOR PREPARING THE SAME AND INJECTION-MOLDED PART BY USE OF THE SAME

BACKGROUND OF THE INVENTION (1) Field of the Invention

The present invention relates to a novel decorative film for use in plastics molding, a process for preparing the decorative film and an injection-molded part obtained by use of the decorative film.

(2) Description of Background Art

As automobile parts, household appliance parts and general industrial parts, plastics molded parts, particularly polypropylene resin molded parts have widely been used in the art. For the purpose of imparting decoration, durability etc. to the polypropylene resin molded part, a coating composition for use in plastics is coated onto the surface of the molded part. However, a coating film formed from the coating composition for use in plastics generally shows poor adhesion properties to the polypropylene resin. On the other hand, a primer is coated for the purpose of improving adhesion properties.

As a method of coating the plastic coating composition onto the above plastics molded part, an electrostatic spray coating is employed so as to improve a coating efficiency with the result that an unsatisfactory coating efficiency raises such problems that a product cost is high and that non-uniform coating on a curved surface area provides poor properties in adhesion properties and finished properties of the plastic coating film.

For the purpose of solving the above problems, for example, Japanese Patent Application Laid-Open Nos. 203048/83, 123469/88, 216717/88, 52416/96, and Japanese Patent Publication No. 2550/96 etc. disclose a method of coating a pigmented coating composition onto the surface of a synthetic resin film to obtain a pigmented film, followed by integrally molding by use of the pigmented film and a molding resin so as to apply the pigmented film onto a molded part and molded products obtained therefrom. Of the above prior art, Japanese Patent Publication No. 2550/96 discloses, as pigmented coating composition, lacquer type coating compositions containing, as base resins, acrylic resin and fluorocarbon resin. However, coating of the above coating compositions onto a polypropylene resin film results poor adhesion properties to the polypropylene resin film to be impractical.

As above described, adhesion of a coating film for use in plastics or a pigmented coating film to polypropylene resin is difficult. For the purpose of overcoming the above difficulty, an attempt to coat a known isocyanate-curing type primer onto the polypropylene resin film has been made. However, the use of the above film in the case where plastics is fabricated to a molded part having high degree of deformation, for example, a bumper results such problems as to develop coating film deffects such as cracks, peeling, etc. of the primer coating film on a three dimensional curved surface area showing high elongation of the molded part. Further, the use of the above primer raised such a problem that an electrostatic coating of a topcoating composition onto the surface of the primer shows a poor coating efficiency.

On the other hand, Japanese Patent Application Laid-Open Nos. 123469/88 and 52416/96 disclose that the pigmented film used therein is such that a metallic base coat is coated on the surface of a coat film such as a transparent film obtained by coating a solution obtained by dissolving a polymer in an organic solvent onto the surface of a substrate, followed by drying and evaporating the organic solvent and stripping from the substrate, a transparent film obtained by casting a solution of a polymer onto a substrate followed by stripping from the substrate or the like to form a metallic coating film.

However, the above pigmented film is a cast film and has such disadvantages that fabrication to a film having a uniform film thickness is difficult and that the fabrication takes a long time. The use of an isocyanate-curing type base coat coating composition and melamine-curing type base coat coating composition in the above metallic base coat, as known as a base coat for use in automobiles, when fabricated to a molded part having high degree of deformation, for example, a bumper results such problems as to develop coating film defects such as cracks, peeling, etc. of the primer coating film on a three dimensional curved surface area showing high elongation of the molded part.

SUMMARY OF THE INVENTION

It is an object of the present invention to provide a decorative film for use in plastics molding, capable of being uniformly and easily joined onto a plastic molded product having a curved surface area and showing good adhesion properties to both plastic material and topcoating film and good finished appearance.

It is another object of the present invention to provide a decorative film for use in plastics molding, capable of being uniformly and easily joined onto a plastic molded product having a curved surface area, showing good adhesion properties to both plastic material and topcoating film, good finished appearance and electrostatic coating workability, particularly high electrostatic coating efficiency of metallic coating composition and high electrostatic coating efficiency of clear coating composition.

It is another object of the present invention to provide a decorative film for use in plastics molding, capable of being uniformly and easily joined onto a plastic molded product having a curved surface area, and showing good adhesion properties to plastic material and good adhesion properties between a transparent film and a pigmented layer.

It is another object of the present invention to provide a plastic molded part showing good finished appearance.

In a first aspect, the present invention provides a decorative film for use in plastics molding and used for obtaining an integrally molded product with the decorative film by a process which comprises setting the decorative film on an inner side of an injection mold and subjecting a molding polyolefin based resin to an injection molding, said decorative film being a laminate film prepared by outwardly and successively laminating a polyolefin film layer, a primer layer, optionally a topcoating layer and a releasable layer, said primer layer being a coating film formed from an isocyanate-curing type resin composition containing (A) a hydroxyl group-containing resin having a hydroxyl number of 30 to 200 KOH mg/g on an average and a weight average molecular weight of 1000 to 80000, (B) a polyolefin based resin and (C) a (blocked)polyisocyanate compound in such mixing amounts that a number of the isocyanate group in the component (C) is in the range of 0.1 to 0.9 per one hydroxyl group in the component (A) and that the component (B) is in the range of 1 to 90% by weight based on a total weight of the components (A), (B) and (C), and having a static glass transition temperature of 20 to 70° C., an elongation of 10% or more and a tensile strength of 0.5 kgf/mm$^2$ or more; a process for preparing a decorative film for use in plastics molding, which process comprises coating an isocyanate-curing type coating composition containing (A) a hydroxyl group-containing resin having a hydroxyl number of 30 to 200 KOH mg/g on an average and a weight average molecular weight of 1000 to 80000, (B) a polyolefin based resin, (C) a (blocked)polyisocyanate compound and (E) an organic solvent in such mixing amounts that a number of the isocyanate group in the component (C) is in the range of 0.1 to 0.9 per one hydroxyl group in the component (A) and that the component (B) is in the range of 1 to 90% by weight based on a total weight of the components (A), (B) and (C) onto one side of a polyolefin based film layer, followed by drying at normal temperature or by heating to form a primer layer having a static glass transition temperature of 20 to 70° C., an elongation of 10% or more and a tensile strength of 0.5 kgf/mm$^2$ or more; and an injection-molded part obtained by setting the decorative film as claimed in claim 1 on an inner side of an injection mold so that the polyolefin film layer can join onto an outer surface of a resin molded product, followed by carrying out an injection molding by use of an injection molding polyolefin based resin.

In a second aspect, the present invention provides a decorative film for use in plastics molding and used for obtaining an integrally molded product with the decorative film by a process which comprises setting the decorative film on an inner side of an injection mold and subjecting a polyolefin based resin for use in molding to an injection molding, said decorative film being a laminate film prepared by outwardly and successively laminating a polyolefin film layer, a primer layer, optionally a topcoating layer and a releasable layer, said primer layer being a coating film formed from an isocyanate-curing type resin composition containing (A) a hydroxyl group-containing resin having a hydroxyl number of 30 to 200 KOH mg/g on an average and a weight average molecular weight of 1000 to 80000, (B) a polyolefin based resin, (C) a (blocked)polyisocyanate compound and (D) an electrically conductive pigment in such mixing amounts that a number of the isocyanate group in the component (C) is in the range of 0.1 to 0.9 per one hydroxyl group in the component (A), that the component (B) is in the range of 1 to 90% by weight based on a total weight of the components (A), (B) and (C) and that the component (D) is in the range of 5 to 300 parts by weight per 100 parts by weight of a total weight of the components (A), (B) and (C), and having a static glass transition temperature of 20 to 70° C., an elongation of 10% or more and a tensile strength of 0.5 kgf/mm$^2$ or more; a process for preparing a decorative film for use in plastics molding, which process comprises coating an isocyanate-curing type coating composition containing (A) a hydroxyl group-containing resin having a hydroxyl number of 30 to 200 KOH mg/g on an average and a weight average molecular weight of 1000 to 80000, (B) a polyolefin based resin, (C) a (blocked)polyisocyanate compound, (D) an electrically conductive pigment and (E) an organic solvent in such mixing amounts that a number of the isocyanate group in the component (C) is in the range of 0.1 to 0.9 per one hydroxyl group in the component (A), that the component (B) is in the range of 1 to 90% by weight based on a total weight of the components (A), (B) and (C) and that the component (D) is in the range of 5 to 300 parts by weight per 100 parts by weight of a total weight of the components (A), (B) and (C) onto one side of a polyolefin based film layer, followed by drying at normal temperature or by heating to form a primer layer having a static glass transition temperature of 20 to 70° C., an elongation of 10% or more and a tensile strength of 0.5 kgf/mm$^2$ or more; and an injection-molded part obtained by setting the above decorative film on an inner side of an injection mold so that the polyolefin film layer can join onto an outer surface of a resin molded product, followed by carrying out injection molding by use of an injection molding polyolefin based resin.

In a third aspect, the present invention provides a decorative film for use in plastics molding and formed by outwardly and successively laminating a plastic film layer, optionally an adhesive layer, a pigmented layer and a transparent film layer, said transparent film layer being a co-extruded laminate film prepared by laminating an outer fluorocarbon polymer film layer and an inner acrylic polymer film layer; and an injection-molded part obtained by setting the above decorative film on an inner side of an injection mold so that the plastic film layer can join onto an outer surface of a resin molded product, followed by carrying out an injection molding by use of an injection molding resin so that the injection molding resin can join onto the plastic film layer of the decorative film.

DETAILED DESCRIPTION OF THE INVENTION

In the first and second aspect of the present invention, the decorative film for use in plastics molding is such that a plastic decorative film having a specified primer layer is joined onto the surface of an injection-molded part. The use of the decorative film makes it possible to impart good durability, adhesion properties to a topcoating and finished appearance.

The above decorative film is a laminate film prepared by laminating a primer layer having, as a sole coating film, a static glass transition temperature of 20 to 70° C., preferably 20 to 60° C., an elongation of 10% or more, preferably 20 to 500%, and a tensile strength of 0.5 kgf/mm$^2$ or more, preferably 0.5 to 3 kgf/mm$^2$ onto the surface of a polyolefin based film layer.

The above polyolefin based film layer may include a film mainly containing known thermoformable polyolefin based resin. Examples of the polyolefin based resin may include polyolefin resins, modified polyolefin resins, etc., for example, polyethylene resin, polybutylene resin, polypropylene resin, ethylene-propylene copolymer and the like. A film thickness of the polyolefin based film layer is in the range of about 20 to 100 μm, preferably about 100 to 300 μm. A film thickness less than about 20 μm may shrink the primer while being dried, resulting deforming the decorative film and making fabrication difficult. On the other hand, a film thickness more than about 1000 μm may undesirably make fabrication difficult.

The polyolefin based film layer may optionally contain additives, for example, colorants such as pigments, dyes and the like, electrically conductive pigments, fillers, ultraviolet light absorbers, ultraviolet light stabilizers, heat stabilizers and the like.

A static glass transition temperature lower than 20° C. of the primer layer formed on the surface of the polyolefin based resin film layer results in that adhesion between primer layers or adhesion thereof with other substrate on rolling the resulting film makes handling difficult, that adhesion between primer layers or adhesion thereof with other substrate on stacking molded parts makes handling difficult, and that adhesion of refuses, spittings, etc. onto the primer layer may take place. On the other hand, the above temperature higher than 70° C. may develop cracks on the primer layer, or may separate the primer layer from the polyolefin based film layer on folding the decorative film. A primer layer having an elongation less than 10% may develop cracks on the primer layer, or may separate the primer layer from the polyolefin based film layer on folding the decorative film. A primer layer having a tensile strength less than 0.5 kgf/mm$^2$ may results in that a primer lay may be squeezed on an area where a high pressure is applied on injection molding so that a film thickness of the primer layer may become thinner in the above area, resulting in making it impossible to form a uniform primer layer.

The glass transition temperature, elongation and tensile strength of the primer layer may be controlled by varying kinds and mixing amounts of the components (A), (B) and (C) in the first aspect of the present invention, or the components (A), (B), (C) and (D) in the second aspect of the present invention.

In the first aspect of the present invention, the decorative film is prepared by a process which comprises coating composition containing (A) a hydroxyl group-containing resin having a hydroxyl number of 30 to 200 KOH mg/g on an average and a weight average molecular weight of 1000 to 80000, (B) a polyolefin based resin, (C) a (blocked) polyisocyanate compound and (E) an organic solvent in such mixing amounts that a number of the isocyanate group in the component (C) is in the range of 0.1 to 0.9 per one hydroxyl group in the component (A) and that the component (B) is in the range of 1 to 90% by weight based on a total weight of the components (A), (B) and (C) onto one side of a polyolefin based film layer, followed by drying at normal temperature or by heating.

In the second aspect of the present invention, the decorative film is prepared by a process which comprises coating an isocyanate-curing type coating composition containing (A) a hydroxyl group-containing resin having a hydroxyl number of 30 to 200 KOH mg/g on an average and a weight average molecular weight of 1000 to 8000, (B) a polyolefin based resin, (C) a (blocked)polyisocyanate compound, (D) an electrically conductive pigment and (E) an organic solvent in such mixing amounts that a number of the isocyanate group in the component (C) is in the range of 0.1 to 0.9 per one hydroxyl group in the component (A) and that the component (B) is in the range of 1 to 90% by weight based on a total weight of the components (A), (B) and (C) onto one side of a polyolefin based film layer, followed by drying at normal temperature or by heating. The electrically conductive pigment (D) may be mixed in such an amount that the primer layer has a surface resistivity to make an electrostatic coating of a topcoating possible, but preferably may be mixed in an amount of 5 to 300 parts by weight, particularly 10 to 200 parts by weight per 100 parts by weight of a total weight of the components (A), (B) and (C). The primer layer preferably has a surface resistivity normally in the range of $1.0\times10^9\Omega$ or less, particularly $1.0\times10^8\Omega$ to $1.0\times10^2\Omega$. When more than $1.0\times10^9\Omega$, an electrostatic coating efficiency may undesirably be reduced.

The isocyanate-curing type resin compositions of the first and second aspects of the present invention are explained hereinbelow.

Hydroxyl Group-containing Resin (A)

The hydroxyl group-containing resin (A) may include a resin having a hydroxyl number of 30 to 200 KOH mg/g on an average, preferably 35 to 150 KOH mg/g on an average, and a weight average molecular weight of 1000 to 8000, preferably 2000 to 60000. A hydroxyl number less than 30 KOH mg/g on an average may undesirably reduce the elongation and tensile strength of the primer layer as well as adhesion properties to the topcoating film. A hydroxyl number more than 200 KOH mg/g on an average may undesirably reduce water resistance of the primer layer. A weight average molecular weight less than 1000 may undesirably reduce the elongation and tensile strength of the primer layer. On the other hand, when more than 8000, an increased viscosity of the primer may undesirably make handling difficult.

The hydroxyl group-containing resin may preferably include hydroxyl group-containing polyester resin, hydroxyl group-containing alkyd resin, hydroxyl group-containing vinyl resin, hydroxyl group-containing epoxy resin and the like.

The hydroxyl group-containing polyester resin may include, for example, ones prepared by esterification reaction or ester exchange reaction of polybasic acids, for example, compounds having 2 to 4 of carboxyl group or methylcarboxylate group in one molecule, for example, (anhydrous)phthalic acid, isophthalic acid, terephthalic acid, (anhydrous)maleic acid, (anhydrous)pyromellitic acid, (anhydrous)trimellitic acid, (anhydrous)succinic acid, sebacic acid, azelaic acid, dodecanedicarboxylic acid, dimethyl isophthalate, dimethylterephthalate and the like with polyhydric alcohols, for example, alcohols having 2 to 6 of hydroxyl group in one molecule, for example, ethylene glycol, propylene glycol, neopentyl glycol, 1,6-hexanediol, diethylene glycol, triethylene glycol, trimethylol propane, pentaerythritol, glycerin, tricyclodecane dimethanol and the like under the condition that hydroxyl group is within the above range.

The hydroxyl group-containing alkyd resin may include ones prepared by subjecting monobasic acids, for example, fatty acids such as castor oil fatty acid, soybean oil fatty acid, tall oil fatty acid, linseed oil fatty acid and the like, benzoic acid, etc. in addition to the above polybasic acid and polyhydric alcohol components to esterification reaction or ester exchange reaction under the condition that hydroxyl group is within the above range.

The hydroxyl group-containing vinyl resin may include, for example, ones prepared by subjecting the following hydroxyl group-containing unsaturated monomer and other unsaturated monomer to radical copolymerization.

Examples of the hydroxyl group-containing unsaturated monomer may include $C_{2-8}$ hydroxyalkyl esters of acrylic acid or methacrylic acid, for example, 2-hydroxyethyl (meth)acrylate, 2-hydroxypropyl (meth)acrylate, 3-hydroxypropyl (meth)acrylate, hydroxybutyl (meth)acrylate and the like; monoesters of polyether polyols such as polyethlene glycol, polypropylene glycol, polybutylene glycol and the like with unsaturated carboxylic acid such as (meth)acrylic acid and the like; monoethers of polyether polyol such as polyethylene glycol, polypropylene glycol, polybutylene glycol and the like with hydroxyl group-containing unsaturated monomer such as 2-hydroxyethyl (meth)acrylate and the like; adducts of α, β-unsaturated carboxylic acid with monoepoxy compound such as Cardura E10 (marketed by Shell Kagaku K.K.), α-olefin epoxide and the like; adducts of glycidyl (meth)acrylate with monobasic acid such as acetic acid, propionic acid, p-t-butyl benzoic acid, fatty acids and the like; monoesterified compound or diesterified compound of acid anhydrous group-containing unsaturated compound with glycols such as ethylene glycol, 1,6-hexanediol, neopentyl glycol and the like; hydroxyalkyl vinyl ether such as hydroxyethyl vinyl ether and the like; chlorine-containing, hydroxyl group-containing monomer such as 3-chloro-2-hydroxypropyl (meth)acrylate and the like; allyl alcohol and the like. Examples of other unsaturated monomers may include $C_{1-24}$ alkylesters or cycloalkylesters of acrylic acid or methacrylic acid, for example, methyl (meth)acrylate, ethyl (meth)acrylate, propyl (meth)acrylate, butyl (meth)acrylate, hexyl (meth)acrylate, 2-ethylhexyl (meth)acrylate, octyl (meth)acrylate, decyl (meth)acrylate, lauryl (meth)acrylate, stearyl (meth)acrylate, cyclohexyl (meth)acrylate and the like; acid unsaturated monomer such as (anhydrous)maleic acid, (meth)acrylic acid and the like; epoxy group-containing unsaturated monomer such as glycidyl (meth)acrylate, and the like; silane unsaturated compound such as γ-(meth)acryloyloxypropyltrimethoxysilane and the like; $C_{2-18}$ alkoxyalkylester of acrylic acid or methacrylic acid, for example, methoxybutyl (meth)acrylate, methoxybutyl (meth)acrylate, methoxyethyl (meth)acrylate, ethoxybutyl (meth)acrylate and the like; aromatic unsaturated compound such as styrene, vinyltoluene and the like; chain alkyl vinyl ethers such as ethyl vinyl ether, n-propyl vinyl ether, isopropyl vinyl ether, butyl vinyl ether, tert-butyl vinyl ether, pentyl vinyl ether, hexyl vinyl ether, octyl vinyl ether and the like; cycloalkyl vinyl ethers such as cyclopentyl vinyl ether, cyclohexyl vinyl ether and the like; aryl vinyl ethers such as phenyl vinyl ether, trivinyl phenyl ether and the like; aralkyl vinyl ethers such as benzyl vinyl ether, phenethyl vinyl ether and the like; allyl ethers such as allyl glycidyl ether, allyl ethyl ether and the like; vinyl esters such as vinyl acetate, vinyl propionate, vinyl lactate, vinyl butyrate, vinyl isobutyrate, vinyl caproate, vinyl isocaproate, vinyl pivalate, vinyl caprate, Veova monomer (marketed by Shell Kagaku K.K.) and the like; propenyl esters such as isopropenyl acetate, isopropenyl propionate and the like; olefin based unsaturated monomer such as ethylene, propylene, butylene, vinyl chloride and the like; diene based unsaturated monomer such as butadiene, isoprene, chloroprene and the like; and the like.

Examples of the hydroxyl group-containing epoxy resin may include Epikote 1004 (trade name, marketed by Oil Shell Epoxy Co., Ltd., bisphenol-epichlorohydrin), esterified compounds of the above epoxy resins with a fatty acid such as the above monobasic acid, and the like.

The above hydroxyl group-containing resins may be used alone or in combination. In the case where two or more resins are used, an average hydroxyl number and an average weight average molecular weight of two or more combined resins may be controlled so as to be within the abovementioned ranges.

The polyolefin based resin may include chlorinated polyolefin resin, modified polyolefin resin and the like.

The above chlorinated polyolefin resin may preferably include a chlorinated polypropylene resin having a degree of chlorination 10 to 50% by weight, preferably 15 to 30% by weight, and a weight average molecular weight of about 3000 to 150000, preferably about 10000 to 100000. A degree of chlorination less than 10% by weight reduces solubility in an organic solvent. On the other hand, a degree of chlorination more than 50% by weight undesirably reduces adhesion properties to the polyolefin film layer. The chlorinated polyolefin based resin may preferably contain an acid monomer in copolymerization. The acid monomer component may be contained in the range of about 10% by weight or less, preferably about 1 to 5% by weight on the basis of the polymer. A weight average molecular weight less than about 3000 undesirably reduces fabrication properties. On the other hand, a weight average molecular weight more than about 150000 undesirably increase a viscosity of the solution, resulting in reducing coating workability. Examples of the chlorinated polyolefin resin may include Superchlon 8921, Superchlon SK-30, Superchlon S-801 (all trade names, marketed by Nippon Paper Industries Co., Ltd.) and the like.

The modified polyolefin resin may include resins prepared by modifying, for example, graft copolymerizing (chlorinated)polyolefin resin with, for example, hydroxyl group-containing unsaturated monomer, acid monomer, epoxy group-containing unsaturated monomer and other unsaturated monomer such as alkyl ester of (meth)acrylic acid as described in the aforementioned hydroxyl group-containing vinyl based resin. The modified polyolefin resin may further include ones prepared by modifying the resin modified with the monomer as above by use of a functional group introduced into the resin, for example, ones prepared by reacting an epoxy group-containing resin with (meth)acrylic acid to introduce unsaturated group into the resin, followed by subjecting to a radical polymerization reaction with an unsaturated monomer such as alkyl ester of (meth)acrylic acid, and ones prepared by reacting a hydroxyl group-containing resin with a polyisocyanate compound and a hydroxyl group-containing unsaturated monomer to introduce unsaturated group into the resin, followed by subjecting to a radical polymerization reaction with an unsaturated monomer such as alkyl ester of (meth)acrylic acid. Examples of the modified polyolefin resin may include Superchlon 142G, Superchlon 143G, Superchlon 334 (all trade names, marketed by Nippon Paper Industries Co., Ltd.), Acrydic LU-835 (trade name, marketed by Dainippon Ink & Chemicals, Inc.), and the like.

A mixing amount of the polyolefin based resin (B) is in the range of 1 to 90% by weight, preferably 2 to 80% by weight based on a total weight of the components (A), (B) and (C). A mixing amount less than 1% by weight reduces adhesion properties to a polyolefin based sheet. On the other hand, a mixing amount more than 90% by weight may reduce adhesion properties to a topcoating.

The use of the (blocked)polyisocyanate compound (C) makes possible crosslinking of the hydroxyl group-containing resin (A) and impart suitable adhesion properties, elongation and tensile strength to the primer layer, resulting in making it possible to form a coating film suitable for molding and fabrication.

The (blocked)polyisocyanate compound (C) may include polyisocyanate compounds and blocked polyisocyanate compounds prepared by partly or completely blocking the isocyanate group of the above compound with a blocking agent. Examples of the polyisocyanate compounds and polyisocyanate compounds to be blocked may include organic diisocyanates, for example, aliphatic diisocyanates such as hexamethylene diisocyanate and trimethylhexamethylene diisocyanate; cycloaliphatic diisocyanates such as hydrogenated xylylene diisocyanate, isophorone diisocyanate; and aromatic diisocyanates such as tolylene diisocyanate and 4'-diphenylmethane diisocyanate; reaction products of respective organic diisocyanates with polyhydric alcohol; adducts thereof with low molecular weight polyester resin or water; cyclic polymers between respective organic diisocyanates; isocyanate.biurets, and the like. Typical examples of commercially available ones may include Burnock D-750, -800, DN-950, -950 and 15-455 (all trade names, marketed by Dainippon Ink & Chemicals, Inc.), Desmodur L, -N, -HL, -IL and -N3390 (all trade names, marketed by Bayer Ltd., Germany), Takenate D-102, -202, -110N and -123N (all trade names, marketed by Takeda Chemical Industries, Ltd.), Coronate L, -HL, -EH and 203 (all trade names, marketed by Nippon Polyurethane Industry), Duranate 24A-90XC, Duranate E5004-90T, Duranate MFK-60 (all trade names, marketed by Asahi Chemical Industry Co., Ltd.), and the like. Of these, aliphatic diisocyanate, cyclic aliphatic diisocyanate, reaction products thereof with polyhydric alcohol, cyclic polymer thereof, isocyanate.biurets thereof, and the like are preferred.

Examples of the blocking agent may include phenol based blocking agent such as phenol, cresol, xylenol, nitrophenol, chlorophenol, methyl hydroxybenzoate and the like; lactam based blocking agent such as ε-caprolactam, δ-valerolactam, γ-butylolactam, β-propiolactam and the like; alcohol based blocking agent such as methanol, ethanol, n-propyl alcohol, isopropyl alcohol, n-butyl alcohol, isobutyl alcohol, t-butyl alcohol, benzyl alcohol, methoxymethanol and the like; oxime blocking agent such as formamidoxime, acetoaldoxime, acetoxime, methyl ethyl ketoxime, diacetylmonooxime, benzophenonoxime, cyclohexaneoxime and the like; active methylene based blocking agent; dimethyl malonate, diethyl malonate, ethyl acetoacetate, methyl acetoacetate, acetylacetone and the like.

A mixing amount of the (blocked)polyisocyanate compound (C) is such that a number of the isocyanate group in the component (C) is in the range of 0.1 to 0.9, preferably 0.2 to 0.7 per one hydroxy group in the component (A). When a number of the isocyanate group is less than 0.1, formation of a crosslinked coating film is made impossible, resulting in undesirably reducing the elongation and tensile strength of the coating film. On the other hand, when more than 0.9, reduction of the hydroxyl group remaining in the crosslinked coating film results poor adhesion properties to the topcoating film.

The electrically conductive pigment (D) used in the second aspect of the present invention may include known electrically conductive pigments, but particularly may include white or lightly gray electrically conductive pigments which scarcely cause such adverse effects on the appearance of topcoating film that brightness of the topcoating film varies depending on absorption or reflection of the light transmitting through the topcoating film on the surface of the primer layer.

Examples of the white electrically conductive pigment may preferably include an antimony-doped tin dioxide pigment [hereinafter referred to as "tin dioxide/antimony (dope)"], zinc oxide pigment and the like. The above tin dioxide pigment may include ones prepared by doping a tin dioxide component as a semiconductive substance with an antimony component to form a donor level of an electron, resulting in increasing electrical conductivity, for example, tin dioxide/antimony (dope) alone and a coating part prepared by coating the tin dioxide/antimony (dope) onto other substrate. Examples of other substrate, onto which the tin dioxide/antimony (dope) and the zinc oxide pigment are coated, may include titanium oxide, potassium titanate, aluminum borate, barium sulfate, mica, silica and the like.

Examples of the shapes of an electrically conductive powder to be used may include shapes of fiber, needle, tetrapot, flake, sphere and the like.

Examples of the tin dioxide/antimony (dope) may include Dentall WK-100S, Dentall WK-100W, Dentall WK-20, Dentall WK-300R (trade names, all marketed by Otsuka Chemical Co., Ltd., potassium titanate, fiber substrate), Dentall WK-500 (trade name, marketed by Otsuka Chemical Co., Ltd., monoclinic titanium oxide, fiber substrate), MEC-300, MEC-500, MEC-700, SEC-250 (trade names, all marketed by Tayka Corporation, electrically conductive mica, mean particle size: 4 to 10 μm), T-1, W-1, W-10 (trade names, all marketed by Mitsubishi Materials Corporation, titanium oxide substrate, sphere, mean particle size: 0.2 μm), FT-1000, FT-2000, FT-2000W (trade names, all marketed by Ishihara Sangyo Kaisha, Ltd., needle, titanium white substrate, average longitudinal axis: 1.6 to 6 μm, average lateral axis: 0.05 to 0.2 μm), and the like.

Examples of the zinc oxide powder may include a spherical zinc oxide powder having a diameter of about 0.1 μm to 2 μm, for example, FW-102 (trade name, marketed by Sumitomo Aluminum Co., Ltd.), 23-K (trade name, marketed by Hakusui Chemical Industries), a tetrapot type zinc oxide powder having a length of about 0.5 μm to 100 μm, preferably about 1 μm to 60 μm, for example, Panatetra (trade name, marketed by Matsushita Amtec Co., Ltd.) and the like.

Of the electrically conductive pigments, a fiber-shaped electrically conductive pigment having an average fiber length of about 1 μm to 50 μm, particularly about 2 μm to 40 μm, and an average fiber diameter of about 0.01 μm to 5 μm, particularly about 0.05 μm to 2 μm is preferable.

The organic solvent (E) used in the first and second aspects of the present invention is a solvent used for dissolving or dispersing the components (A), (B) and (C) in the first aspect or the components (A), (B), (C) and (D) in the second aspect and controlling viscosity so as to make possible coating, printing, etc. Examples of the organic solvent (E) may include hydrocarbon series such as hexane, heptane, toluene, xylene and the like; alcohol series such as propanol, butanol and the like; cellosolve, methylcellosolve, butylcellasolve, methylcarbitol, ether series such as diethylene glycol monoethyl ether, diethylene glycol monobutyl ether, triethylene glycol monomethyl ether and the like; ketone series such as acetone, methyl ethyl ketone, 2-pentanone, methyl isobutyl ketone, isophorone and the like; acetate series such as methyl acetate, ethyl acetate, propyl acetate, butyl acetate, 2-ethylhexyl acetate, cellosolve acetate, carbitol acetate and the like, and the like.

A mixing amount of the organic solvent (E) may vary depending on the components (A), (B), (C) and (D) as well as other additives, but is normally such that a solid content is in the range of about 10 to 90% by weight, preferably about 30 to 70% by weight.

The isocyanate-curing type resin composition may contain a cellulose based resin such as nitrocellulose, acetyl cellulose, cellulose acetate butylate, cellulose propionate and the like. Of these, cellulose acetate butylate is preferable. Examples of the trade names thereof may include CAB551-0.2, CAB551-0.01, CAB531-1, CAB-381-0.5, CAB381-0.1, CAB381-2 (trade names, all marketed by Eastman Chemical Company), and the like. A mixing amount of the cellulose based resin is in the range of about 100 parts by weight or less, preferably about 70 parts by weight or less, more preferably about 10 to 60 parts by weight per 100 parts by weight of the components (A), (B) and (C). The cellulose based resin does not impart tackiness to the isocyanate-cured coating film and has advantages free of troubles such as fusing and bonding on contacting between primer coating film surfaces of a molded product, development of flaws on contacting with others, and adhesion of refuse, spittings, etc. onto the surface of the coating film.

The isocyanate-curing type resin composition may optionally contain additives, for example, coloring agent such as pigments, dyes, etc., electrically conductive pigments, fillers, ultraviolet light absorber, ultraviolet light stabilizer, heat stabilizer, catalysts and the like.

The decorative film in the first and second aspects of the present invention may be prepared by coating the above isocyanate-curing type resin composition onto the surface of the polyolefin based film layer, followed by drying at normal temperature or by heating. A coating method may include, for example, spray coating, roll coating, knife coating, curtain flow coating, silk screen coating, gravure printing and the like.

The primer layer has a dry film thickness in the range of about 5 to 100 μm, preferably about 30 to 60 μm. A film thickness less than about 5 μm makes thiner a film thickness of the primer layer in an area where a degree of deformation on molding is high, resulting in reducing durability, adhesion properties, etc. On the other hand, a film thickness more than about 100 μm undesirably results a high production cost, long drying time, increased development of coating film deffects such as bubbling, blisters and the like, development of shrinkage on the surface of the coating film due to difference in a degree of curing between the surface and interior of the coating film, and the like.

Prior to coating the primer, the surface of the polyolefin based film layer may be treated by a corona discharge treatment or the like.

Heating conditions of the isocyanate-curing type resin composition may vary depending on kinds of organic solvents to be used and formulations, but, for example, are such as in the range of about 30 to 100° C. and in the range of about 1 to 90 minutes.

The decorative film in the first and second aspects of the present invention is a laminate film prepared by outwardly and successively laminating a polyolefin based film layer, primer layer, optionally topcoating layer, and optionally a releasable film layer. The topcoating layer may be explained hereinbelow. In the case where the topcoating layer is not formed, after molding, a topcoating composition may be coated to form a topcoating layer.

Onto another surface of the polyolefin based film layer, that is, an opposite surface to the primer layer, a thermoplastic resin layer may be applied. The thermoplastic resin may preferably include a resin having a heat softening point lower than that of the polyolefin based resin. The use of the thermoplastic resin layer makes it possible to recover a molded part and a decorative film separately, for example, by heating a molded part after use at the softening temperature or higher of the thermoplastic resin, but at a temperature lower than the softening temperature of the polyolefin based resin, followed by separating between the thermoplastic resin layer and a molding polyolefin resin layer.

The releasable film makes possible to prevent separation due to adhesion between an inner surface of a mold and the surface of the primer layer. The releasable film may include any known releasable films. Examples of the releasable film may include papers and films respectively treated with a releasing agent such as silicone, wax, fluorocarbon resin and the like, and ones prepared by laminating a releasable film such as a film showing releasable properties by itself. The releasable film has a film thickness normally in the range of about 10 to 1000 μm, preferably about 20 to 500 μm.

The decorative film for use in plastics molding in the third aspect of the present invention may be prepared by joining a decorative film having a specified transparent film layer onto the surface of an injection-molded part. The use of the above decorative film makes it possible to impart good durability and finished appearance to the molded part.

In the third aspect of the present invention, the plastic film layer in the decorative film may be used for the purpose of joining the decorative film onto the surface of the plastic molded product. That is, the decorative film and a molding plastic material are subjected to a co-extrusion molding so that a pigmented layer and the transparent film layer are melted and joined through the plastic film layer with the plastic molded product.

Specific examples of the resins used in the above plastic film layer may include thermoplastic resins such as polyethylene, polypropylene, polyisobutylene, polybutadiene, polystyrene, polychloroprene, polyvinyl chloride, polyvinyl acetate, nylon, acrylic resin, polycarbonate, cellulose, polyethylene terephthalate, polyacetal, AS resin, ABS resin and the like.

The resin used in the plastic film layer may preferably include the same type thermoplastic resins as those used in the molded part from the standpoints of joining properties and workability.

The plastic film layer may optionally contain known additives such as coloring agents, fillers, plasticizers, heat stabilizers and the like.

The plastic film layer desirably has a film thickness normally in the range of about 20 to 1000 μm, preferably about 100 to 300 μm. A film thickness less than about 20 μm may undesirably reduce the finished appearance of the plastic molded part. On the other hand, a film thickness more than about 1000 μm may undesirably results in showing poor workability due to difficulties in handling and in reducing finished appearance of the plastic molded part.

A substrate treatment such as the corona discharge treatment and the like may optionally be carried out between the plastic film layer, the optional adhesive layer and the pigmented layer.

The optionally used adhesive layer is a layer formed from known pressure-sensitive and heat-sensitive adhesives, for example, natural rubber, polyisobutylene, acrylic resin, ethylene/vinyl acetate copolymer, polyurethane, polyester, silicone rubber, fluorocarbon rubber, polyvinyl butylal and the like. The adhesive layer may also contain, for example, adhesion-imparting agent, adhesion controlling agent, anti-aging agent, stabilizer, coloring agent and the like. The adhesive layer has a coating film thickness normally in the range of about 5 to 60 μm, preferably about 7 to 40 μm.

In the third aspect of the present invention, the pigmented layer in the decorative film may also include, for example, a coating film formed by use of a pigmented coating composition prepared by mixing a color pigment with a non-curing type, thermoplastic, organic solvent-evaporating type resin.

The organic solvent-evaporating type coating composition is a composition capable of forming a dry coating film only by evaporating the organic solvent, and may include, for example, coating compositions prepared by dissolving or dispersing a resin such as polyester resin, alkyd resin, epoxy resin, vinyl acetate resin, vinyl chloride resin, vinyl acetate/vinyl chloride copolymer resin, fluorocarbon resin, urethane resin, silicone resin, rubber based resin, acrylic resin, cellulose based resin and the like into the organic solvent. The above may also include graft resins formed from at least two resins exemplified as above, mixed resins of at least two resins exemplified as above, and the like. The above exemplified resins may also contain a functional group such as an oxidative polymerization unsaturated group, hydrolyzable silyl group and the like, resulting in being partly cured by use of the functional group. The above exemplified resins having a functional group such as hydroxyl group and the like may be mixed with, for example, a polyisocyanate compound curing agent to partly be cured. The above exemplified resins having epoxy group may be mixed, for example, with a polycarboxylic acid compound curing agent to partly be cured. The partial curing may be carried out to such an extent that the functional group of the resin is reacted in an amount of about 50 mole % or less, preferably 40 mole % or less.

Examples of the color pigment may include inorganic pigments such as carbon black, titanium oxide and the like; organic pigments, for example, quinacridone series such as quinacridone red and the like; azo series such as pigment red and the like; phthalocyanine series such as phthalocyanine blue, phthalocyanine green and the like; and the like; flake-shaped powders representing metallic feeling or pearl feeling color as in the case of aluminum powder, copper powder, mica-like iron oxide powder, bronze powder, stainless steel powder and the like, and the like. These pigments may be used alone or in combination. Of these pigments, the flake-shaped powder capable of representing a metallic feeling or pearl feeling color is preferably used.

A mixing amount of the coloring agent may vary depending on performances, kinds, etc. as required, but desirably is in the range of about 0.5 to 300 parts by weight, preferably about 3 to 150 parts by weight per 100 parts by weight of the resin solid content. In addition to the above, the pigmented resin composition may optionally contain plasticizers, fillers, flowability controlling agents, ultraviolet light absorbers and the like.

The pigmented layer may be formed by means of a gravure coater, silk screen, offset printing, knife coater, roll coater, air spray, brush and the like. The pigmented layer desirably has a film thickness in the range of about 10 to 100 μm, particularly about 20 to 50 μm.

The pigmented layer may be dried by leaving to stand at room temperature or by heating depending on kinds of the organic solvents and resin compositions to be used.

The pigmented layer, as a sole coating film prior to molding, has a static glass transition temperature of 20 to 90° C., preferably 20 to 80° C., an elongation of 5% or more, preferably 5 to 500%, and a tensile strength of 0.5 kgf/mm² or more, preferably 2 to 5 kgf/mm².

A pigmented layer having a static glass transition temperature lower than 20° C. may result a film showing poor durability. On the other hand, when higher than 90° C., cracks may undesirably develop in the pigmented layer on folding the decorative film. A pigmented layer having an elongation less than 5% may result that cracks may undesirably develop in the pigmented layer on folding the decorative film. A pigmented layer having a tensile strength less than 0.5 kgf/mm² results such disadvantages that the primer layer may be squeezed in an area where a high pressure is applied on injection molding and has a thiner film thickness in that area, resulting in making it impossible to obtain a uniform pigmented layer, and so forth.

The above organic solvent may include ones capable of dissolving or dispersing the resin without particular limitations. Example of the organic solvent may include the same ones as in the organic solvent (E).

A mixing amount of the above organic solvent is such that a solid content is in the range of about 10 to 90% by weight, preferably about 30 to 70% by weight.

In the third aspect of the present invention, the transparent film layer used in the decorative film is a co-extrusion laminate film prepared by laminating a outer fluorocarbon polymer film layer and an inner acrylic polymer film layer.

Examples of the polymers used in the fluorocarbon polymer film layer may include vinyl fluoride polymer, vinylidene fluoride polymer, ethylene trifluoride polymer, alkylene copolymers thereof, and the like.

The fluorocarbon polymer film may also contain a copolymer of a fluorocarbon monomer with an acrylic monomer.

The fluorocarbon-acrylic copolymer may preferably contain the fluorocarbon monomer in an amount of more than 50% by weight.

The acrylic polymer film layer may preferably include an acrylic polymer having a glass transition temperature in the range of 60 to 150° C., preferably 90 to 140° C. The above polymer may be a homopolymer or copolymer. A glass transition temperature lower than 60° C. may undesirably develop the deformation of the decorative film when a temperature of a molded part mounted on an automobile is raised. On the other hand, a glass transition temperature higher than 150° C. undesirably makes molding and fabrication difficult.

The glass transition temperature (Tg) is a numerical value calculated according to the following equation. The above numerical values were converted from "° K" to "° C." to be represented.

$$1/Tg = W_1/Tg_1 + W_2/Tg_2 + W_3/Tg_3 \cdots$$

where Tg represents a glass transition temperature (° K) of the above polymer. "$Tg_1, Tg_2, Tg_3, \cdots$" represent respective glass transition temperatures (° K) of respective homopolymers of respective monomers used in the preparation of a copolymer. "$W_1, W_2, W_3, \cdots$" represent respectively "% by weight" of respective monomers used in the preparation of a copolymer. Glass transition temperatures (° K) of homopolymers are values cited from Polymer Hand Book (Second Edition, Edited by J. Brandrup E. H. Immergut).

$$100 = W_1 + W_2 + W_3 + \cdots$$

The above polymer preferably has a number average molecular weight in the range of 20000 or more, preferably 40000 to 1000000. A number average molecular weight less than 20000 undesirably reduces durability of the film.

The acrylic polymer film may also contain a copolymer of an acrylic monomer with a fluorocarbon monomer. The acrylic-fluorocarbon copolymer may preferably contain the acrylic monomer in an amount of more than 50% by weight.

Examples of the acrylic monomer may include ones having a Tg of 60° C. or higher, for example, methyl methacrylate, ethyl methacrylate, ter-butyl methacrylate and the like. These monomers may be used alone or in combination.

The above monomers may be used in combination with monomers having a Tg less than 60° C. as exemplified hereinafter. Specific examples thereof may include alkyl esters and cycloalkyl esters such as methyl acrylate, ethyl acrylate, n-propyl acrylate, isopropyl acrylate, n-butyl acrylate, isobutyl acrylate, hexyl acrylate, 2-ethylhexyl acrylate, n-octyl acrylate, decyl acrylate, lauryl acrylate, stearyl acrylate, cyclohexyl acrylate, n-propyl methacrylate, isopropyl methacrylate, n-butyl methacrylate, isobutyl methacrylate, hexyl methacrylate, 2-ethylhexyl methacrylate, octyl methacrylate, decyl methacrylate, lauryl methacrylate, stearyl methacrylate, cyclohexyl methacrylate and the like; hydroxyl group-containing monomers such as 2-hydroxy ethyl (meth)acrylate, 3-hydroxypropyl acrylate and the like. Monomers having a Tg of 60° C. or higher, for example, (meth)acrylic acid, 2-hydroxypropyl methacrylate, styrene, (meth)acrylamide, glycidyl (meth)acrylate and the like, may be used in combination with the above polymer.

In the third aspect of the present invention, the transparent film layer may preferably include a co-extrusion laminate film prepared by laminating an outer layer of vinylidene polyfluoride film layer and an inner layer of polymethylmethacrylate film layer from the standpoint of such effects that a hard coating film having good mar resistance due to crystallizability of vinylidene polyfluoride is obtained, that a good affinity of vinylidene polyfluoride with polymethylmethacrylate results good adhesion properties, transparency, and the like, that chemical resistance is improved, that adhesion properties between polymethylmethacrylate and adhesive is improved, and that an ultraviolet light absorber insoluble in an organic solvent or a component added in a large amount may arbitrarily be added.

The transparent film layer is such that the outer layer has a film thickness in the range of 2 to 50 $\mu$m, preferably 3 to 20 $\mu$m, the inner layer has a film thickness in the range of 10 to 500 $\mu$m, preferably 30 to 80 $\mu$m, and a total film thickness of both outer and inner layers is in the range of 12 to 200 $\mu$m, preferably 33 to 100 $\mu$m. An outer layer having a film thickness less than 2 $\mu$m undesirably reduces weather resistance, solvent resistance, chemical resistance, etc. On the other hand, an outer layer having a film thickness more than 50 $\mu$m reduces transparency, etc. An inner layer having a film thickness less than 10 $\mu$m may soften the film, resulting in reducing coating workability and in making handling difficult. On the other hand, an inner layer having a film thickness 500 $\mu$m may undesirably reduce fabricating properties.

In the third aspect of the present invention, the decorative film may be prepared, for example, by a process which comprises coating a pigmented coating composition onto a transparent film to form a pigmented layer and to prepare a laminate film of the transparent film and the pigmented layer.

The injection-molded part of the present invention may be prepared by subjecting a decorative film and a plastic material to a co-extruding injection molding so that the surface of a plastic film layer in the decorative film may contact with the outer surface of a plastic molded product.

In the present invention, an injection molding process comprises setting the above decorative film within a convex or concave mold, injecting a heated and melted plastic material onto the decorative film set as above to be filled with the plastic material, followed by cooling and removing the plastic material as a molded part. The decorative film to be set within the mold may preferably be set so that a primer layer, topcoating layer or transparent film layer in the decorative film may contact with an inner surface of the mold, and that a plastic film layer may contact with a plastic surface. On injecting the heated and melted plastic material onto the decorative sheet set within the mold, the heated and melted plastic material may be filled in the direction of the surface of the plastic layer in the decorative film so that the melted plastic material may not be filled between the surface of the mold and the surface of the decorative film. The decorative film may have such a size as to corresponding to a total or part of the inner surface of the mold. That is, variation in size of the decorative film makes it possible to form the decorative film onto the total or part of the surface of the plastic molded part. The decorative film may also be formed by a process which comprises subjecting the decorative film to a preliminary fabrication so as to contact with a concave, inner surface of the mold, followed by setting the fabricated decorative film so that the surface of the primer layer or transparent film layer in the decorative film may be faced and contacted with the concave inner surface of the mold, injecting the heated and melted plastic material into the mold to be filled, and molding to form a decorative film melted and adhered onto the surface of the plastic molded product. The preliminary fabrication may be carried out, for example, by heating the decorative film at such a temperature as to be softened and fabricated, followed by applying onto the concave or convex surface of the mold while pressing.

The plastic material may include ones known in the art without particular limitations, for example, polyethylene, polypropylene, polyisobutylene, polybutadiene, polystyrene, polychloroprene, polyvinyl chloride, polyvinyl acetate, nylon, acrylic resin, polycarbonate, cellulose, polyethylene, terephthalate, polyacetal, AS resin, ABS resin, glass fiber-reinforced resins prepared by mixing glass fiber with the above, and the like. Of these, polyolefin based resins are preferable, and polypropylene based resins are more preferable.

The plastic material may optionally contain known additives such as coloring agent, fillers, plasticizers, heat stabilizers and the like.

A molding temperature may arbitrarily be selected depending on kinds of decorative films and plastic materials, but desirably is in such ranges that melting temperatures of plastics are in the range of about 180 to 250° C., preferably about 180 to 230° C., and mold temperatures are in the range of about 30 to 70° C., preferably about 40 to 50° C.

In the first and second aspects of the present invention, in the case where a topcoating composition has not been coated, a topcoating composition may be coated onto the surface of the primer layer in an injection-molded product. The topcoating composition may include a room temperature-drying type resin coating composition, a curable type resin coating composition curable at room temperature or by heating at a temperature in the range of 140° C. or lower, and an actinic radiation-curable type resin coating composition. The normal temperature-drying type resin coating composition may include, for example, acrylic lacquer and the like. The curable type resin coating composition may include, for example, resin coating compositions prepared by mixing a base resin consisting of polyol resin such as vinyl resin, polyester resin, silicone resin, fluorocarbon resin and the like with a crosslinking agent such as (blocked)polyisocyanate compound, amino resin, alkoxysilane group-containing compound and the like; resin coating compositions prepared by mixing resins containing alkoxysilane group, hydroxyl group and epoxy group, and unsaturated resins such as vinyl resin, polyester resin, silicone resin and the like with a peroxide catalyst such as butyl peroxide and the like; and the like. The actinic radiation-curable type resin coating composition may include, for example, resin coating compositions containing the above unsaturated resins optionally further containing unsaturated monomer such as (meth)acrylate, styrene, (poly)ethylene glycol di(meth)acrylate and the like; and the like.

In addition to the above resin components, the topcoating composition may optionally contain, for example, organic solvents, color pigments, fillers, flowability controlling agents, curing catalysts, ultraviolet light absorbers and the like. The topcoating composition may coated by one coat coating, metallic base coat/clear coat multilayer finish coating, etc. The topcoating film desirably has such coating film thickness that one coat has a film thickness in the range of about 10 to 80 $\mu$m, and the multilayer coating finishing has a base coat film thickness in the range of about 10 to 50 $\mu$m, and a clear coat film thickness in the range of about 20 to 80 $\mu$m.

The injection-molded part of the present invention may has uses without particular limitations, but shows good properties in molding and fabricating properties, finished appearance, durability, adhesion properties to the pot coating composition, and the like, and is particularly useful as automobile parts such as a bumper, side mirror, side lace and the like.

Firstly the present invention makes it possible to provide a decorative film for use in plastics molding, capable of being uniformly and easily joined onto a plastic molded product having a curved surface area and showing good adhesion properties to both plastic material and topcoating film and good finished appearance.

Secondary, the present invention makes it possible to provide a decorative film for use in plastics molding, capable of being uniformly and easily joined onto a plastic molded product having a curved surface area, showing good adhesion properties to both plastic material and topcoating film, good finished appearance and electrostatic coating workability, particularly high electrostatic coating efficiency of metallic coating composition and high electrostatic coating efficiency of clear coating composition.

Thirdly, the present invention makes it possible to provide a decorative film for use in plastics molding, capable of being uniformly and easily joined onto a plastic molded product having a curved surface area, and showing good adhesion properties to plastic material and good adhesion properties between a transparent film and a pigmented layer.

Fourthly, the present invention makes it possible to provide a plastic molded part showing good finished appearance.

The present invention is explained more in detail by the following Examples.

EXAMPLE 1

Preparation Example 1 (Preparation of Primer)

A primer was prepared by mixing and dispersing 60 parts by weight of a polyester resin (phthalic acid/hexahydrophthalic acid/adipic acid/1,6-hexane diol/trimethylol propane=0.18/0.46/0.3/0.2/0.1 mole, hydroxyl number: 103 KOH mg/g, dibasic acid ratio: 0.94), 10 parts by weight of Superchlon 143G (trade name, marketed by Nippon Paper Industries Co., Ltd.), 50 parts by weight of CAB551-0.2 (trade name, marketed by Eastman Chemical Company), 50 parts by weight of Taibake CR93 (trade name, titanium dioxide pigment), 120 parts by weight of ethyl acetate, and 0.3 equivalent (hydroxyl group of polyester resin/NCO) of Duranate E5004-90T (trade name, marketed by Asahi Chemical Industry Co., Ltd., polyisocyanate compound).

Preparation Example 2 (Preparation of Decorative Film)

A primer prepared in Preparation Example 1 was coated by use of a knife coater onto one side of PPS-C (trade name, Cedam Co., Ltd., polypropylene based resin film, film thickness: 200 μm), followed by drying at 80° C. for 30 minutes to prepare a decorative sheet having a primer layer of 25 μm in thickness, and applying a releasable film (silicone-treated polyethylene terephthalate, thickness; 50 μm) onto the surface of the primer layer in the decorative sheet to obtain a decorative film. A static glass transition temperature, elongation and tensile strength of the primer layer formed as above are shown in Table 1. Test results of anti-tack properties, adhesion properties and adhesion properties to topcoating for the decorative film obtained as above are shown in Table 1.

In Table 1, anti-tack properties, adhesion properties, adhesion properties A to topcoating, adhesion properties B to topcoating, and molding properties mean as follows respectively.

Anti-Tack Properties

Primer coating films were lapped together, followed by applying a load of 6 g/cm$^2$, leaving to stand at 20° C. for one hour, and examining adhesion properties to evaluate as follows. 3: Easily separable without being adhered; 2: adhered; 1: non-separable due to adhesion. Adhesion Properties (Adhesion properties between polyolefin base material and primer coating film): A coating film was cut so as to reach a substrate with a sharp knife to form 100 squares having a size of 1×1 mm respectively, followed by adhering an adhesive cellophane tape onto the surface of the squares, and strongly separating the tape to evaluate conditions on the surface with the squares as follows. 3: No squares separated; 2: some squares are separated; 1: many squares are separated.

Adhesion Properties A to Topcoating

Soflex -1410 (trade name, marketed by Kansai Paint Co., Ltd., melamine-curing type acrylic resin based metallic base coating composition) was coated so as to be a dry film thickness of 20 μm by spray coating, followed by preliminarily heating, coating Soflex 1630 Clear (trade name, marketed by Kansai Paint Co., Ltd., melamine-curing type acrylic resin based clear coating composition) so as to be a dry film thickness of 30 μm by spray coating, heat curing at 120° C. for 30 minutes, and subjecting to the same adhesion properties test as above to evaluate as follows. 3: No separation between primer coating film and topcoating film was observed; 2: some separation therebetween was observed; 1: considerable separation therebetween was observed.

Adhesion Properties B to Topcoating

A Softex 400 H (trade name, marketed by Kansai Paint Co., Ltd., isocyanate-curing type acrylic resin based metallic base coating composition) was coated so as to be a dry film thickness of 20 μm by spray coating, followed by preliminarily heating, coating Softex 500H Clear (trade name, marketed by Kansai Paint Co., Ltd., isocyanate-curing type acrylic resin based clear coating composition) so as to be a dry film thickness of 30 μm by spray coating, heat curing at 80° C. for 20 minutes, and subjecting to the same adhesion properties test as above to evaluate as follows. 3: No separation between primer coating film and topcoating film was observed; 2: some separation therebetween was observed; 1: considerable separation therebetween was observed.

Molding Properties

The decorative film obtained as above was set on an inner surface of an injection mold capable of molding in a cup type (maximum degree of deformation:two fold) so that the primer layer of the decorative film can be contacted with the inner surface of the mold, followed by injecting under pressure the polypropylene heated and melted at about 230° C. in an injection molding machine onto the surface of the polypropylene based resin film layer in the decorative film, cooling the mold, and removing a molded product from the mold to obtain a polypropylene molded part.

Conditions in curved surface area and plane surface area of the polypropylene molded part obtained as above were evaluated as follows. 3: No deffects such as reduction in gloss, peeling, cracks were observed, showing good appearance; 2: reduction in gloss was observed; 1: reduction in gloss, peeling, cracked were observed.

EXAMPLE 2

Procedures of Example 1 were duplicated except that the primer listed in Table 1 was used. Results are shown in Table 1.

EXAMPLE 3

Procedures of Example 1 were duplicated except that the primer listed in Table 1 was used. Results are shown in Table 1.

Comparative Example 1

Procedures of Example 1 were duplicated except that the primer listed in Table 1 was used. Results are shown in Table 1.

Comparative Example 2

Procedures of Example 1 were duplicated except that the primer listed in Table 1 was used. Results are shown in Table 1.

A static glass transition temperature, elongation and tensile strength of the primer layer formed as above are shown in Table 2. The anti-tack properties, adhesion properties and adhesion properties to topcoating of the decorative film obtained as above examined, and results are shown in Table 2.

In Table 2, anti-tack properties, adhesion properties, adhesion properties A to topcoating, adhesion properties B to topcoating and molding properties have the same meanings as in Table 1 respectively.

In Table 2, electrostatic coating efficiency of metallic base coating composition, electrostatic coating efficiency of clear coating composition and lightness of primer coating film mean as follows respectively.

Electrostatic Coating Efficiency of Matallic Base Coating Composition

TABLE 1

| | | Example 1 | Example 2 | Example 3 | Comparative Example 1 | Comparative Example 2 |
|---|---|---|---|---|---|---|
| Formulation | Polyester resin | 60 | 60 | 90 | 60 | 60 |
| | Superchlon 143G | 10 | 10 | 30 | 10 | 10 |
| | CAB551-0.2 | 50 | 50 | 0 | 50 | 50 |
| | Duranate E5004 (equivalent) | 0.3 | 0.5 | 0.5 | 1 | 0.05 |
| | Taybake CR93 | 50 | 50 | 50 | 50 | 50 |
| Coating film physical properties | glass transition temperature (° C.) | 61 | 68 | 54 | 70 | 58 |
| | elongation (%) | 47 | 59 | 55 | 20 | 48 |
| | tensile strength (kgf/mm$^2$) | 1.2 | 2.3 | 2.1 | 3.1 | 1.1 |
| Coating film performance | adhesion properties | 3 | 3 | 3 | 3 | 1 |
| | molding properties | 3 | 3 | 3 | 1 | 3 |
| | anti-tack properties | 3 | 3 | 3–2 | 3 | 3 |
| | adhesion properties A to topcoating | 3 | 3 | 3 | 2 | — |
| | adhesion properties B to topcoating | 3 | 3 | 3 | 2 | — |

EXAMPLE 4

Preparation Example 3 (Preparation of Primer)

A primer was prepared by mixing and dispersing 54 parts by weight of polyester resin (phthalic acid/hexahydrophthalic acid/adipic acid/1,6-hexane diol/trimethylol propane=0.18/0.46/0.3/0.2/0.1 mole, hydroxyl number: 103 KOH mg/g, dibasic acid ratio: 0.94), 13 parts by weight of Superchlon 143G (trade name, marketed by Nippon Paper Industries Co., Ltd.), 33 parts by weight of CAB551-0.2 (trade name, marketed by Eastman Chemical Company), 20 parts by weight of Tanbake CR93 (trade name, titanium dioxide-pigment), 80 parts by weight of Dentall WK-500 (trade name, marketed by Otsuka Chemical Co., Ltd., fiber-shaped electrically conductive pigment, average fiber length: 5–15 μm, average fiber diameter: 0.1–0.5 μm), 120 parts by weight of ethyl acetate, and 0.3 equivalent (NCO in polyester resin/hydroxyl group) of Duranate E5004-90T (trade name, marketed by Asahi Chemical Industry Co., Ltd., polyisocyanate compound).

Preparation Example 4 (Preparation of Decorative Film)

The above primer was coated by use of a knife coater onto one side of PPS-C (trade name, marketed by Cedam Co., Ltd., polypropylene based resin film, thickness 200 μm), followed by drying at 80° C. for 30 minutes to prepare a decorative film having a primer layer of 25 μm, and applying a releasable film (silicone-treated, non-crystalline polyethylene terephthalate, thickness 50 μm) onto the surface of the primer layer obtained as above to prepare a decorative film.

Soflex 1410 (trade name, marketed by Kansai Paint Co., Ltd., melamine-curing type acrylic resin based metallic base coating composition) was coated onto the surface of the primer layer in the above decorative film so as to be a dry film thickness of 20 μm by electrostatic spray coating, followed by heat curing at 120° C. for 30 minutes.

The electrostatic coating was carried out by use of an air spray electrostatic coating machine with REA gun, marketed by Landsberg Co., Ltd. under the conditions of a coating area of 100 cm×100 cm, coating voltage of −60V, and coating amounts of 300 to 400 g/min.

Coating Efficiency=(part by weight of solid content of the coating composition which has coated and formed a film part by weight of solid content of the coating composition which was coated)×100

Electrostatic Coating Efficiency of Clear Coating Composition

Soflex 1630 Clear (trade name, marketed by Kansai Paint Co., Ltd., melamine-curing type acrylic resin based clear coating composition) was coated onto the surface of the above metallic coating film so as to be a dry film thickness of 30 μm by electrostatic coating, followed by heat curing at 120° C. for 30 minutes.

The electrostatic coating was carried out by use of a rotary Bell type electrostatic coating machine marketed by Landsberg Co., Ltd., Microbell, under the conditions of a coating area of 100 cm×100 cm, coating voltage of −90V, and coating amounts of 200 to 300 g/min. The coating efficiency was determined in the same manner as above.

Lightness of Primer Coating Film

The surface of the coating film was visually evaluated as follows. 4: white and good; 3: lightly gray and good; 2: a little dark gray; 1: gray.

Surface Resistivity of Primer Coating Film

The surface resistivity was measured by use of a high resistance tester model TR-3 (marketed by IDX Corporation).

EXAMPLE 5

Procedures of Example 4 were duplicated except that Taybake CR93 and Dentall WK-500 were used in amounts as listed in Table 2 respectively. Results are shown in Table 2.

EXAMPLE 6

Procedures of Example 4 were duplicated except that Taybake CR93 and Dentall WK-500 were used in amounts as listed in Table 2 respectively. Results are shown in Table 2.

Comparative Example 3

Procedures of Example 4 were duplicated except that Taybake CR93 and Dentall WK-500 were used in amounts as listed in Table 2 respectively. Results are shown in Table 2.

nating PS-C (plastic film layer), heat seal layer (adhesive layer), pigmented layer, and Kureha KFC film FT-50Y (transparent layer).

Test results of the performances and molding properties of the decorative film obtained in Example 7 are shown in Table 3.

Table 3

|  | Example 7 | Example 8 | Comp. Ex 4 |
|---|---|---|---|
| Finished appearance Performance | 4 | 4 | 3 |
| surface hardness | H | HB | B |
| adhesion properties water resistance | 3 | 3 | 3 |
| appearance | 3 | 3 | 3 |

TABLE 2

| | | Example 4 | Example 5 | Example 6 | Comparative Ex. 3 |
|---|---|---|---|---|---|
| Formu-lation | Polyester resin | 54 | 54 | 54 | 54 |
| | Superchlon 143G | 13 | 13 | 13 | 13 |
| | CAB551-0.2 | 33 | 33 | 33 | 33 |
| | Duranate E5004 (equivalent) | 0.3 | 0.3 | 0.3 | 0.3 |
| | Taybake CR93 | 20 | 25 | 30 | 100 |
| | Dentall WK500 | 80 | 100 | 120 | 0 |
| Metallic coating composition electrostatic coating efficiency (%) | | 45 | 50 | 55 | 30 |
| Clear coating composition electrostatic coating efficiency (%) | | 72 | 74 | 80 | 10 |
| Lightness of primer coating film | | 4 | 4 | 4 | 4 |
| Coating film physical properties | coating film surface resistivity ($\Omega$) | $1 \times 10^6$ | $1 \times 10^7$ | $1 \times 10^6$ | $>1 \times 10^{11}$ |
| | glass transition temperature (° C.) | 61 | 61 | 61 | 61 |
| | elongation (%) | 47 | 45 | 41 | 47 |
| | tensile strength (kgf/mm$^2$) | 1.2 | 1.2 | 1.3 | 1.2 |
| Coating film perfor-mance | adhesion properties | 3 | 3 | 3 | 3 |
| | molding properties | 3 | 3 | 3 | 3 |
| | anti-tack properties | 3 | 3 | 3 | 3 |
| | adhesion properties A to topcoating | 3 | 3 | 3 | 3 |
| | adhesion properties B to topcoating | 3 | 3 | 3 | 3 |

EXAMPLE 7

Preparation Example 5 (Preparation of Decorative Film)

Acrylic #2000 Silver metallic (trade name, marketed by Kansai Paint Co., Ltd., acrylic lacquer, elongation 8%, tensile strength 3.7 kgf/mm$^2$, glass transition temperature 78° C.) was coated onto the surface of Kureha KFC film FT-50Y (trade name, marketed by Kureha Chemical Industry Co., Ltd., film thickness 50 μm, vinylidene polyfluoride layer 5 μm/polymethyl methacrylate layer 4.5 μm) by spay spay coating, followed by heating and drying at 45° C. for 60 minutes to form a pigmented layer.

MHS-3356 (trade name, marketed by Toyo-Morton, Ltd., hot lacquer type heat sealing agent, ethylene vinyl acetate resin) was coated onto one side of PPS-C (trade name, marketed by Cedam Co., Ltd., prolypropyrene based resin film, thickness 200 μm) so as to be a dry film thickness of 10 to 20 μm to form a film having a heat seal layer, followed by setting so that the pigmented layer may be folded on the heat seal layer, heating under pressure, and laminating to prepare a decorative film outwardly and successively lami- -continued

|  | Example 7 | Example 8 | Comp. Ex 4 |
|---|---|---|---|
| adhesion properties | 3 | 3 | 2 |
| molding properties | 4 | 4 | 3 |
| solvent resistance | 3 | 2 | 2 |

In Table 3, adhesion properties and molding properties are the same as in Table 1. Adhesion properties in water resistance test was carried out after water resistance test.

In Table 3, finished appearance, surface hardness, water resistance, and solvent resistance mean as follows respectively.

Finished Appearance

Finished appearance of the decorative film was visually evaluated by glass, bubbling, smoothness, shrinkage, metallic feeling, etc. as follows. 4: good; 3: a little poor but good, 2; poor; 1: seriously poor.

Surface Hardness

Surface hardness of the transparent film was measured according to pencil scratching test defined in JIS K-5400 8.4.2 (1990). Evaluation was made depending on development of mars.

Water Resistance

The decorative film was dipped into water at 40° C. for 7 days to evaluate the condition of the film surface as follows.

Appearance

3: nothing abnormal; 2: some blisters, developed; 1: blisters seriously developed.

Solvent Resistance

A gauze impregnated with acetone solvent was place on the surface of the transparent film, followed by reciprocally rubbing 20 times strongly pressing the gauze with the finger for testing. After testing, the film surface was visually evaluated as follows. 3: no changes in glossiness; 2: glossiness disappeared; 1: dissolved.

EXAMPLE 8

Procedures of Example 7 were duplicated except that the decorative film prepared in Preparation Example 6 was used. Results are shown in Table 3.

Preparation Example 6 (Preparation of Decorative Film)

A decorative film was prepared in the same manner as in Preparation Example 5 except that Denka DX Film DX-14S (trade name, marketed by Denki Kagaku Kogyo Kabushiki Kaisha, film thickness 50 μm, upper layer vinylidene polyfluoride/polymethyl methacrylate=8/2 weight ratio, 17 μm; lower layer polymethyl methacrylate/vinylidene polyfluoride=2/8 weight ratio, 33 μm) was used in place of Kureha KFC Film FT-50Y.

Comparative Example 4

Procedures of Example 7 were duplicated except that a casting film prepared by dissolving vinylidene polyfluoride/polymethyl methacrylate=8/2 (weight ratio) into dimethyl aceto-amide solution, followed by casting onto a glass plate, and drying to form a casting film having a thickness of about 50 μm was used as the transparent film. Results are shown in Table 3.

What is claimed is:

1. A decorative film for use in plastics molding and used for obtaining an integrally molded product with the decorative film by a process which comprises setting the decorative film on an inner side of an injection mold and subjecting a molding polyolefin resin to injection molding, said decorative film being a laminate film prepared by outwardly and successively laminating a polyolefin film layer, a primer layer, optionally a topcoating layer and a releasable layer, said primer layer being a coating film formed from an isocyanate-curing resin composition containing (A) a hydroxyl group-containing resin having a hydroxyl number of 30 to 200 KOH mg/g on an average and a weight average molecular weight of 1000 to 80000, (B) a polyolefin resin and (C) a (blocked) polyisocyanate compound in such mixing amounts that a number of the isocyanate group in the component (C) is in the range of 0.1 to 0.9 per one hydroxyl group in the component (A) and that the component (B) is in the range of 1 to 90 percent by weight based on a total weight of the components (A), (B) and (C), and having a static glass transition temperature of 20 to 70° C., an elongation of 10 percent or more and a tensile strength of 0.5 kgf/mm$^2$ or more.

2. The injection-molded part obtained by setting the decorative film as claimed in claim 1 on an inner side of an injection mold so that the polyolefin film layer joins onto an outer surface of a resin molded product, followed by carrying out an injection molding by use of an injection molding polyolefin resin.

3. An injection-molded part as claimed in claim 2, wherein the injection-molded part is a bumper.

4. The decorative film as claimed in claim 1, wherein the isocyanate-curing resin composition further contains (D) an electrically conductive pigment in an amount of 5 to 300 parts by weight per 100 parts per weight of a total weight of the components (A), (B) and (C).

5. A decorative film as claimed in claim 4, wherein the primer layer has a surface resistivity of $1.0 \times 10^9 \Omega$ or less.

6. The injection-molded part obtained by setting the decorative film as claimed in claim 4, on an inner side of an injection mold so that the polyolefin film layer joins onto an outer surface of a resin molded product, followed by carrying out injection molding by use of an injection molding polyolefin resin.

7. An injection-molded part as claimed in claim 6, wherein the injection-molded part is a bumper.

* * * * *